United States Patent
Yoon et al.

(10) Patent No.: US 9,474,117 B2
(45) Date of Patent: *Oct. 18, 2016

(54) AC LED LIGHTING APPARATUS USING VOLTAGE EDGE DETECTOR

(71) Applicant: GLOW ONE CO., LTD., Yongin-si (KR)

(72) Inventors: Seong Bok Yoon, Seongnam-si (KR); Dae Won Kim, Seongnam-si (KR); Jong-Bum Kim, Seongnam-si (KR)

(73) Assignee: Glow One Co., Ltd., Yongin-si (KR)

( * ) Notice: Subject to any disclaimer, the term of this patent is extended or adjusted under 35 U.S.C. 154(b) by 151 days.

This patent is subject to a terminal disclaimer.

(21) Appl. No.: 14/223,095

(22) Filed: Mar. 24, 2014

(65) Prior Publication Data

US 2014/0203722 A1 Jul. 24, 2014

Related U.S. Application Data

(63) Continuation of application No. 13/770,162, filed on Feb. 19, 2013, now Pat. No. 8,766,550.

(30) Foreign Application Priority Data

Jan. 11, 2013 (KR) .................. 10-2013-0003291

(51) Int. Cl.
H05B 33/08 (2006.01)
H05B 37/02 (2006.01)

(52) U.S. Cl.
CPC ........ H05B 33/083 (2013.01); H05B 33/0806 (2013.01); H05B 33/0824 (2013.01); H05B 33/0887 (2013.01); H05B 37/02 (2013.01)

(58) Field of Classification Search
CPC H05B 33/08; H05B 33/083; H05B 33/0887; H05B 33/0824; H05B 33/0806; H05B 37/02
USPC ............ 315/201, 186, 191, 200 R, 210–211, 315/217, 291, 294, 297, 301, 307–308
See application file for complete search history.

(56) References Cited

U.S. PATENT DOCUMENTS 8,766,550 B1 * 7/2014 Yoon .................... H05B 33/083
                                                        315/200 R
2008/0297067 A1    12/2008 Wang et al.
(Continued)

FOREIGN PATENT DOCUMENTS

JP    2004-119422       4/2004
JP    2009-283775      12/2009
(Continued)

OTHER PUBLICATIONS

Non-Final Office Action issued on Jan. 2, 2014 in U.S. Appl. No. 13/770,162.

(Continued)

*Primary Examiner* — Jimmy Vu
*Assistant Examiner* — Henry Luong
(74) *Attorney, Agent, or Firm* — H.C. Park & Associates, PLC

(57) ABSTRACT

An AC LED lighting apparatus using a voltage edge detector is provided. The AC LED lighting apparatus includes: a rectification unit configured to rectify an AC voltage to output a DC rectified voltage; an LED unit including a first light emitting group and a second light emitting group each including at least one LED; and an LED driving control unit configured to control a serial/parallel connection relationship between the first light emitting group and the second light emitting group by comparing a voltage level of the rectified voltage input from the rectification unit with a reference voltage. The LED driving control unit sets the reference voltage by detecting a slope of the rectified voltage and simultaneously detecting the voltage level of the rectified voltage and the detected slope of the rectified voltage.

18 Claims, 6 Drawing Sheets

(56) References Cited

U.S. PATENT DOCUMENTS

| | | |
|---|---|---|
| 2010/0123403 A1 | 5/2010 | Reed |
| 2012/0235585 A1 | 9/2012 | Lys et al. |
| 2012/0256550 A1 | 10/2012 | Akiyama |
| 2013/0200812 A1 | 8/2013 | Radermacher et al. |
| 2015/0296582 A1* | 10/2015 | Jung .................. H05B 33/0812 315/185 R |

FOREIGN PATENT DOCUMENTS

| | | |
|---|---|---|
| JP | 2012-151337 | 8/2012 |
| JP | 2013-008547 | 1/2013 |
| KR | 10-1062193 | 9/2011 |
| KR | 10-1064906 | 9/2011 |
| KR | 2011-0128426 | 11/2011 |
| KR | 10-2012-0026949 | 3/2012 |
| KR | 10-1198395 | 11/2012 |
| KR | 10-2013-0001135 | 1/2013 |
| TW | 201212702 | 3/2012 |
| WO | 2012/052893 | 6/2012 |

OTHER PUBLICATIONS

Notice of Allowance dated on Mar. 31, 2014 in U.S. Appl. No. 13/770,162.

Non-Final issued Dec. 23, 2015, in U.S. Appl. No. 14/223,072.

Notice of Allowance mailed Jun. 13, 2016, in U.S. Appl. No. 14/223,072.

* cited by examiner

AC LED LIGHTING APPARATUS USING VOLTAGE EDGE DETECTOR

CROSS-REFERENCE TO RELATED APPLICATIONS

This application is a continuation of U.S. patent application Ser. No. 13/770,162, filed on Feb. 19, 2013 and claims priority from and the benefit of Korean Patent Application No. 10-2013-0003291, filed on Jan. 11, 2013, which are hereby incorporated by reference for all purposes as if fully set forth herein.

BACKGROUND

1. Field

The present invention relates to an AC LED lighting apparatus using a voltage edge detector, and more particularly, to an AC LED lighting apparatus using a voltage edge detector, which is capable of detecting a rising or falling slope of a sine wave signal (for example, a rectified voltage ($V_{rec}$)) by using a voltage edge detector, and sequentially driving the AC LED lighting apparatus and controlling a serial/parallel connection relationship among a plurality of LED groups according to the detected slope.

2. Discussion of the Background

A light emitting diode (LED) is a semiconductor element that is made of a material such as gallium (Ga), phosphorus (P), arsenic (As), indium (In), nitrogen (N), and aluminum (Al). The LED has a diode characteristic and emits red light, green light, or yellow light when a current flows therethrough. Compared with a bulb or lamp, the LED has a long lifespan, a fast response speed (time until light is emitted after a current flows), and low power consumption. Due to these advantages, the LED has tended to be widely used.

In general, a light emitting element could be driven only at a DC voltage due to the diode characteristic. Therefore, a light emitting device using a conventional light emitting element is restrictive in use and must include a separate circuit, such as SMPS, so as to use an AC voltage that has been currently used at home. Consequently, the circuit of the light emitting device becomes complicated and the manufacturing cost of the light emitting device increases.

In order to solve these problems, much research has been conducted on a light emitting element that can also be driven at an AC voltage by connecting a plurality of light emitting cells in series or in parallel.

FIG. 1 is a block diagram illustrating a configuration of a conventional AC LED lighting apparatus, and FIG. 2 is a waveform diagram illustrating waveforms of a rectified voltage and an LED driving current in the conventional AC LED lighting apparatus illustrated in FIG. 1.

As illustrated in FIG. 1, the conventional AC LED lighting apparatus includes an AC power source $V_{AC}$, a rectification unit 10, a first light emitting group 20, a second light emitting group 22, a third light emitting group 24, a fourth light emitting group 26, a driving control unit 40, a first light emitting group driving unit SW1, a second light emitting group driving unit SW2, a third light emitting group driving unit SW3, and a fourth light emitting group driving unit SW4. Specifically, the rectification unit 10 receives an AC voltage from the AC power supply $V_{AC}$ and performs a full-wave rectification on the AC voltage to output a rectified voltage Vrec. The first light emitting group 20, the second light emitting group 22, the third light emitting group 24, and the fourth light emitting group 26 receive the rectified voltage $V_{rec}$ and are sequentially driven. The driving control unit 40 controls the sequential driving of the first light emitting group 20, the second light emitting group 22, the third light emitting group 24, and the fourth light emitting group 26 according to a voltage level of the rectified voltage $V_{rec}$. The first light emitting group driving unit SW1, the second light emitting group driving unit SW2, the third light emitting group driving unit SW3, and the fourth light emitting group driving unit SW4 have a switching function and a constant current control function.

A process of driving the conventional AC LED lighting apparatus will be described below with reference to FIG. 2. The driving control unit 40 determines the voltage level of the rectified voltage $V_{rec}$ applied from the rectification unit 10, and sequentially drives the first light emitting group 20, the second light emitting group 22, the third light emitting group 24, and the fourth light emitting group 26 according to the determined voltage level of the rectified voltage $V_{rec}$.

Accordingly, in periods during which the voltage level of the rectified voltage $V_{rec}$ is equal to or higher than a first threshold voltage $V_{TH1}$ and lower than a second threshold voltage $V_{TH2}$ (t1 to t2 and t7 to t8 in one cycle of the rectified voltage $V_{rec}$), the driving control unit 40 maintains the first switch SW1 in a turned-on state and maintains the second switch SW2, the third switch SW3, and the fourth switch SW4 in a turned-off state, so that only the first light emitting group 20 is driven. In addition, in periods during which the voltage level of the rectified voltage $V_{rec}$ is equal to or higher than the second threshold voltage $V_{TH2}$ and lower than a third threshold voltage $V_{TH3}$ (t2 to t3 and t6 to t7 in one cycle of the rectified voltage $V_{rec}$), the driving control unit 40 maintains the second switch SW2 in a turned-on state and maintains the first switch SW1, the third switch SW3, and the fourth switch SW4 in a turned-off state, so that only the first light emitting group 20 and the second light emitting group 22 are driven.

In addition, in periods during which the voltage level of the rectified voltage $V_{rec}$ is equal to or higher than the third threshold voltage $V_{TH3}$ and lower than a fourth threshold voltage $V_{TH4}$ (t3 to t4 and t5 to t6 in one cycle of the rectified voltage $V_{rec}$), the driving control unit 40 maintains the third switch SW3 in a turned-on state and maintains the first switch SW1, the second switch SW3, and the fourth switch SW4 in a turned-off state, so that the first light emitting group 20, the second light emitting group 22, and the third light emitting group 24 are driven.

In addition, in periods during which the voltage level of the rectified voltage $V_{rec}$ is higher than the fourth threshold voltage $V_{TH4}$ (t4 to t5 in one cycle of the rectified voltage $V_{rec}$), the driving control unit 40 maintains the fourth switch SW4 in a turned-on state and maintains the first switch SW1, the second switch SW2, and the third switch SW3 in a turned-off state, so that all of the first light emitting group 20, the second light emitting group 22, the third light emitting group 24, and the fourth light emitting group 26 are driven. However, in the conventional AC LED lighting apparatus described above, when the AC voltage is applied, a rising or falling slope of a sine wave signal is changed with time according to the magnitude of the AC voltage signal, and thus, the moment at which the switches are switched for the sequential driving is changed. Therefore, when the slope of the sine wave signal is large (that is, the magnitude of the input voltage increases), the LED is turned on earlier. When the magnitude of the input voltage is small, the LED is switched later, so that a current flows for a short time, that is, a turn-on time is shortened. Therefore, power consumption is irregularly decreased. As a result, when the conventional AC LED lighting apparatus is used, the switching time of the LED is generally changed according to the magnitude of the input voltage, making it difficult to maintain constant power. Furthermore, the conventional AC LED lighting apparatus includes a plurality of LED arrays, and sequentially turns on and off the plurality of light emitting groups according to the voltage level of the rectified voltage. Thus, since the light emission periods of the respective light emitting groups are different, the optical uniformity of the AC LED lighting apparatus is degraded and the lifespan of the plurality of light emitting groups becomes different. Consequently, the AC LED lighting apparatus is dependent on the LED array with the light emission period having the long lifespan.

SUMMARY

The present invention has been made in an effort to solve the above-described problems of the related art.

The present invention is directed to provide an AC LED lighting apparatus, which can detect a rising or falling slope of an input voltage by using a voltage edge detector and accurately control a driving control time point of the AC LED lighting apparatus.

The present invention is also directed to provide an AC LED lighting apparatus, which can improve optical uniformity and brightness of the lighting apparatus by causing all light emitting groups to emit light at above a predetermined voltage level in such a manner that a rising or falling slope of an input voltage is detected by using a voltage edge detector and a series/parallel connection relationship among a plurality of light emitting groups are accurately controlled.

The characteristic configurations of the present invention for achieving the above objects of the present invention and achieving unique effects of the present invention are as follows.

An aspect of the present invention is directed to an AC LED lighting apparatus, including: a rectification unit configured to rectify an AC voltage to output a DC rectified voltage; an LED unit including a first light emitting group and a second light emitting group each including at least one LED; and an LED driving control unit configured to control a serial/parallel connection relationship between the first light emitting group and the second light emitting group by comparing a voltage level of the rectified voltage input from the rectification unit with a reference voltage, wherein the LED driving control unit sets the reference voltage by detecting a slope of the rectified voltage and simultaneously detecting the voltage level of the rectified voltage and the is detected slope of the rectified voltage.

The LED driving control unit may include: a voltage edge detector configured to detect a slope of a currently input rectified voltage, and output a second control signal corresponding to the detected slope of the rectified voltage to a control logic; a reference voltage generator configured to generate a reference voltage according to a reference voltage setting signal output from the control logic; a comparator configured to compare a voltage level of a set reference voltage with a voltage level of the currently input rectified voltage and output a first control signal corresponding to a comparison result to the control logic; and the control logic configured to control a serial/parallel connection relationship between the first light emitting group and the second light emitting group by detecting the first control signal and the second control signal input from the comparator, and output the reference voltage setting signal.

The second control signal may contain information about whether the currently input rectified voltage is included in a rising period or a falling period.

In a case where the voltage level of the rectified voltage reaches a first threshold voltage in a state where the reference voltage is set as the first threshold voltage, when the currently input rectified voltage is included in the rising period, the control logic may change the reference voltage to a second threshold voltage, and when the currently input rectified voltage is included in the falling period, the control logic may generate the reference voltage setting signal for maintaining the reference voltage at the first threshold voltage. In a case where the voltage level of the rectified voltage reaches a second threshold voltage in a state where the reference voltage is set as the second threshold voltage, when the currently input rectified voltage is included in the falling period, the control logic may maintain the reference voltage at the second threshold voltage, and when the currently input rectified voltage is included in the falling period, the control logic may generate the reference voltage setting signal for changing the reference voltage to the first threshold voltage.

The second control signal may contain information about an actual slope of the currently input rectified voltage.

In order to compensate for a delay caused by signal processing within the LED driving control unit, the control logic may set the reference voltage by detecting the information about the actual slope of the currently input rectified voltage, which is contained in the second control signal.

The LED unit may further include a first switch, a second switch, and a third switch configured to change a circuit such that the first light emitting group and the second light emitting group are connected in series or in parallel according to the voltage level of the rectified voltage, and the LED driving control unit may perform control such that the connection relationship between the first light emitting group and the second light emitting group is changed to a parallel connection or a serial connection by controlling the first to third switches according to the first control signal and the second control signal.

When the input rectified voltage is equal to or higher than the first threshold voltage and lower than the second threshold voltage, the LED driving control unit may perform control such that the first light emitting group and the second light emitting group are connected in parallel by turning on the first switch and the second switch and turning off the third switch.

When the input rectified voltage is equal to or higher than the second threshold voltage, the LED driving control unit may perform control such that the first light emitting group and the second light emitting group are connected in series by turning off the first switch and the second switch and turning on the third switch.

The first switch, the second switch, and the third switch included in the LED unit may be controlled by switch control signals (CS1 to CS3) output from the LED driving control unit.

Each of the switches may be one selected from a metal-oxide semiconductor field effect transistor (MOSFET), an insulated gate bipolar transistor (IGBT), a bipolar junction transistor (BJT), a junction field effect transistor (JFET), a thyristor (silicon controlled rectifier), and a triac.

Another aspect of the prevent invention is directed to provide an LED driving control unit for controlling a serial/parallel connection relationship among a plurality of light emitting groups according to a voltage level of a rectified voltage, including: a voltage edge detector configured to detect a slope of a currently input rectified voltage, and output a second control signal corresponding to the detected slope of the rectified voltage to a control logic; a reference voltage generator configured to generate a reference voltage according to a reference voltage setting signal output from the control logic; a comparator configured to compare a voltage level of a set reference voltage with a voltage level of the currently input rectified voltage and output a first control signal corresponding to a comparison result to the control logic; and the control logic configured to control a serial/parallel connection relationship between the first light emitting group and the second light emitting group by detecting the first control signal and the second control signal input from the comparator, and output the reference voltage setting signal, wherein the control logic calculates a variation of the rectified voltage for a delay time, generates the reference voltage setting signal in a rising period of the rectified voltage such that a voltage level obtained by subtracting the calculated variation of the rectified voltage from a threshold voltage is set as the reference voltage, and generates the reference voltage setting signal in a falling period of the rectified voltage such that a voltage level obtained by adding the calculated variation of the rectified voltage to the threshold voltage is set as the reference voltage.

The second control signal output from the voltage edge detector may contain information about an actual slope of the currently input rectified voltage, and the control logic may calculate the variation of the rectified voltage for the delay time by substituting the delay time into the information about the actual slope of the rectified voltage contained in the second control signal.

The voltage edge detector may detect the variation of the rectified voltage for the delay time and generate the second control signal further containing the detected variation of the rectified voltage, and the control logic may generate the reference voltage setting signal, based on the detected variation of the rectified voltage contained in the second control signal.

The control logic may calculate a reference voltage adjustment value by subtracting a preset margin value from the calculated variation of the rectified voltage for the delay time, generate the reference voltage setting signal in the rising period of the rectified voltage such that a voltage level obtained by subtracting the calculated reference voltage adjustment value from the threshold voltage is set as the reference is voltage, and generate the reference voltage setting signal in the falling period of the rectified voltage such that a voltage level obtained by adding the calculated reference voltage adjustment value to the threshold voltage is set as the reference voltage.

The LED driving control unit may control the serial/parallel connection relationship between the first light emitting group and the second light emitting group. An LED unit including the first light emitting group and the second light emitting group further may include a first switch, a second switch, and a third switch for changing a circuit such that the first light emitting group and the second light emitting group are connected in series or in parallel according to a control of the LED driving control unit. The LED driving control unit may perform control such that the connection relationship between the first light emitting group and the second light emitting group is changed to a parallel connection or a serial connection by controlling the first to third switches according to the first control signal and the second control signal.

When the input rectified voltage is included in the rising period, the control logic may set a voltage level obtained by subtracting the calculated variation of the rectified voltage from a first threshold voltage as a first reference voltage, and set a voltage level obtained by subtracting the calculated variation of the rectified voltage from a second threshold voltage as a second reference voltage. When the input rectified voltage is included in the falling period, the control logic may set a voltage level obtained by adding the calculated variation of the rectified voltage to the first threshold voltage as the first reference voltage, and may set a voltage level obtained by adding the calculated variation of the rectified voltage to the second threshold voltage as the second reference voltage.

When the voltage level of the input rectified voltage is equal to or higher than the first reference voltage and lower than the second reference voltage, the control logic may perform control such that the first light emitting group and the second light emitting group are connected in parallel by turning on the first switch and the second switch and turning off the third switch.

When the input rectified voltage is equal to or higher than the second reference voltage, the control logic may perform control such that the first light emitting group and the second light emitting group are connected in series by turning off the first switch and the second switch and turning on the third switch.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
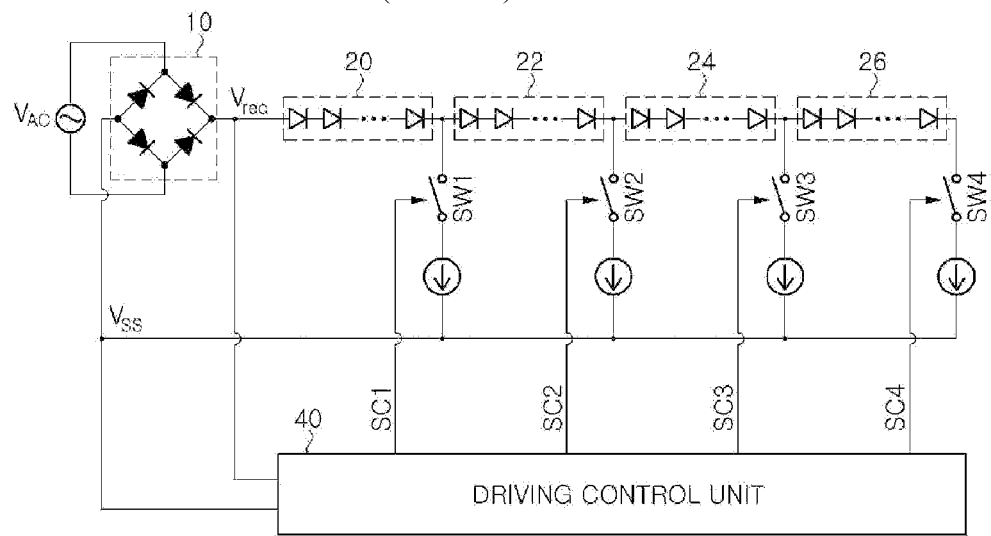
FIG. 1 is a block diagram illustrating a configuration of a conventional AC LED lighting apparatus.
Figure 2:
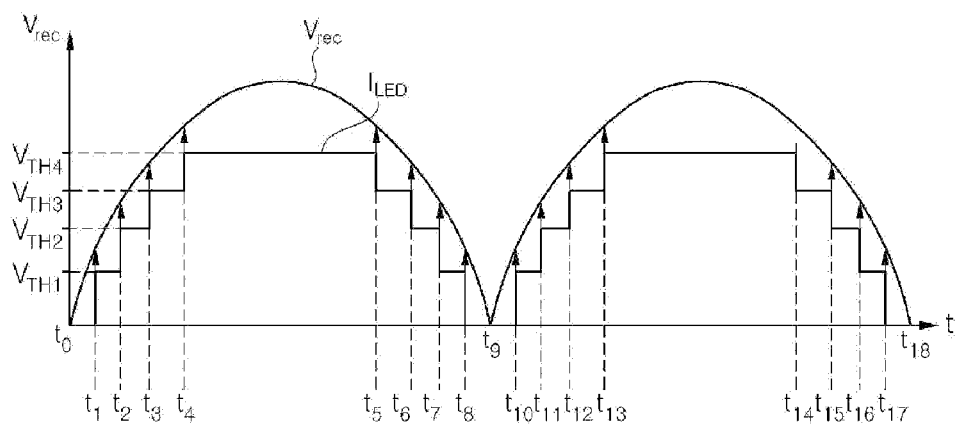
FIG. 2 is a waveform diagram illustrating waveforms of a rectified voltage and an LED driving current in the conventional AC LED lighting apparatus illustrated in FIG. 1.

Specific embodiments of the present invention will be described below in detail with reference to the accompanying drawings. These embodiments will be fully described in such a manner that those skilled in the art can easily carry out the present invention. It should be understood that various embodiments of the present invention are different from one another, but need not be mutually exclusive. For example, specific shapes, structures and characteristics described herein can be implemented in other embodiments, without departing from the spirit and scope of the present invention. In addition, it should be understood that the positions and arrangements of the individual elements within the disclosed embodiments can be modified without departing from the spirit and scope of the present invention. Therefore, the following detailed description is not intended to be restrictive. If appropriately described, the scope of the present invention is limited only by the accompanying claims and the equivalents thereof. Throughout the drawings, similar reference numerals refer to same or similar functions in various aspects.

Hereinafter, preferred embodiments of the present invention will be described in detail with reference to the accompanying drawings, such that those skilled in the art can easily carry out the present invention.

In the embodiments of the present invention, the term "light emitting group" refers to a group of LEDs (LED packages) connected in series, in parallel, or in series/parallel to emit light within a lighting apparatus, and refers to a group of LEDs whose operations are controlled as one unit (that is, turned on/off at the same time) under the control of a control unit.

Also, the term "threshold voltage level $V_{TH}$" refers to a voltage level that can drive a single light emitting group. The term "first threshold voltage level $V_{TH1}$" is a voltage level that can drive a first light emitting group, and the term "second threshold voltage level $V_{TH2}$" is a voltage level that can drive a first light emitting group and a second light emitting group. When the threshold voltage level of the first light emitting group and the threshold voltage level of the second light emitting group are equal to each other, the second threshold voltage level $V_{TH2}$ is $2V_{TH1}$. Therefore, in the following, the term "n-th threshold voltage level $V_{THn}$" refers to a voltage level that can drive all of the first to n-th light emitting groups.

Figure 3:
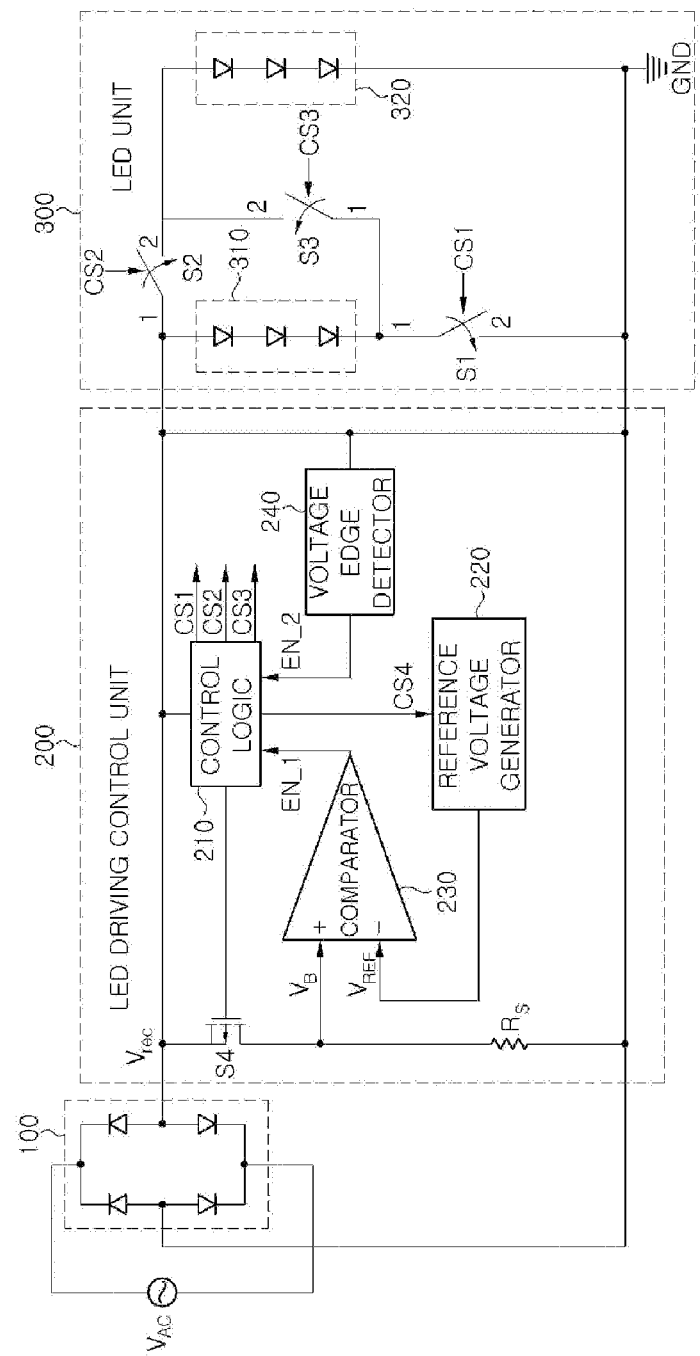
FIG. 3 is a block diagram illustrating a configuration of an AC LED lighting apparatus according to an exemplary embodiment of the present invention.

FIG. 3 is a block diagram illustrating a configuration of an AC LED lighting apparatus according to an exemplary embodiment of the present invention. Hereinafter, the configuration and function of the AC LED lighting apparatus according to the exemplary embodiment of the present invention will be described in detail with reference to FIG. 3.

As illustrated in FIG. 3, the AC LED lighting apparatus according to the present invention may include a rectification unit 100, an LED driving control unit 200, and an LED unit 300.

The rectification unit 100 may be configured to receive an AC voltage $V_{AC}$ from an AC power supply disposed inside or outside the AC LED lighting apparatus, rectify the received AC voltage $V_{AC}$, and output a rectified voltage $V_{rec}$.

As described above, the AC LED lighting apparatus cannot be provided with a constant current/constant voltage circuit, such as SMPS, due to its characteristic. Therefore, the rectification unit 100 according to the present invention can be implemented with a half-wave rectification circuit or a full-wave rectification circuit constituted by a full-bridge. In addition, although not illustrated, the rectification unit 100 according to the present invention may further include a surge protection unit (not illustrated) and a fuse unit (not illustrated). The surge protection unit may be implemented with a varistor or the like that can protect a circuit from a surge voltage, and the fuse unit may be implemented is with a fuse or the like that can protect a circuit from overcurrent.

The LED unit 300 according to the present invention receives the rectified voltage $V_{rec}$ applied from the rectification unit 100 and emits light. Various types of the LED unit 300 may be used for the AC LED lighting apparatus according to the present invention. More specifically, the AC LED lighting apparatus can use an LED unit that can perform switching to connect a plurality of LED groups constituting the LED unit 300 in series or in parallel according to the voltage level of the rectified voltage $V_{rec}$ under the control of the LED driving control unit 200. In order to perform the series/parallel switching function, the LED unit 300 according to the present invention may include a first light emitting group 310 with at least one LED, a second light emitting group 320 with at least one LED, and first to third switches SW1, SW2 and SW3 configured to switch the connection between the first light emitting group 310 and the second light emitting group 320 in series or in parallel under the control of the LED driving control unit 200. Hereinafter, for convenience of description and understanding, the following description will focus on the first light emitting group 310 and the second light emitting group 320 each including a plurality of LEDs connected in series and having the same threshold voltage level, but the present invention is not limited thereto. It is apparent that various configurations of the LED unit 300 fall within the scope of the present invention. On the other hand, the first switch S1, the second switch S2, and the third switch S3 may be implemented using one of a metal-oxide semiconductor field effect transistor (MOSFET), an insulated gate bipolar transistor (IGBT), a bipolar junction transistor (BJT), a junction field effect transistor (JFET), a thyristor (silicon controlled rectifier), and a triac, which can be turned on or off according to a switch control signal input from the LED driving control unit 200. Furthermore, the first switch S1, the second switch S2, and the third switch S3 according to the present invention may be configured to perform a constant current control such that the current flows through the switches with a predetermined constant current value under the control of the LED driving control unit 200.

As illustrated in FIG. 3, the first switch SW1 is connected between a cathode of the first light emitting group 310 and the ground GND, the second switch SW2 is connected between an anode of the first light emitting group 310 and an anode of the second light emitting group 320, and the third switch SW3 is connected between the cathode of the first light emitting group 310 and the anode of the second light emitting group 320. The first to third switches SW1, SW2 and SW3 are turned on or off according to the switch control signal output from the LED driving control unit 200.

The LED driving control unit 200 according to the present invention receives the rectified voltage $V_{rec}$ output from the rectification unit 100, compares a voltage level of the input rectified voltage $V_{rec}$ with a voltage level of a reference voltage, and controls a serial/parallel connection relationship between the first light emitting group 310 and the second light emitting group of the LED unit 300 according to the comparison result. In order to perform such a function, as illustrated in FIG. 3, the LED driving control unit 200 according to the present invention may include a voltage edge detector 240, a reference voltage generator 220, a comparator 230, and a control logic 210.

The voltage edge detector 240 detects a slope of the currently input rectified voltage $V_{rec}$, generates a second control signal EN_2 corresponding to the detected slope of the rectified voltage $V_{rec}$, and outputs the second control signal EN_2 to the control logic 210. As illustrated in FIG. 3, the voltage edge detector 240 monitors a voltage across the LED unit 300, that is, the rectified voltage $V_{rec}$, and detects the slope of the currently input rectified voltage $V_{rec}$, based on a variation in the voltage level. The voltage edge detector 240 generates the second control signal EN_2 corresponding to the detected slope and outputs the second control signal EN_2 to the control logic 210. According to the configuration of the exemplary embodiment, the second control signal EN_2 may include only information indicating whether the rectified voltage $V_{rec}$ is currently included in a period during which the rectified voltage $V_{rec}$ rises or falls, or may include information about the detected slope.

The reference voltage generator 220 receives a reference voltage setting signal CS4 output from the control logic 210, generates a reference voltage $V_{REF}$ according to the input reference voltage setting signal, and outputs the reference voltage $V_{REF}$ to the comparator 230. In the exemplary embodiment, the reference voltage generator 220 according to the present invention may be configured to output the first threshold voltage $V_{TH1}$ as the reference voltage $V_{REF}$ according to the reference voltage setting signal CS4. When another reference voltage setting signal CS4 is input, the reference voltage generator 220 according to the present invention may be configured to output the second threshold voltage $V_{TH2}$ as the reference voltage $V_{REF}$. Furthermore, when the LED driving control unit 200 according to the present invention is configured to compensate for a delay caused by signal processing, the reference voltage generator 220 may be configured to output a voltage obtained by adjusting the first threshold voltage $V_{TH1}$ (for example, a voltage corresponding to 90% of the first threshold voltage $V_{TH1}$) as the reference voltage $V_{REF}$ in the rising period of the rectified voltage $V_{rec}$ according to the reference voltage setting signal CS4. When another reference voltage setting signal CS4 is input, the reference voltage generator 220 according to the present invention may be configured to output a voltage obtained by adjusting the second threshold voltage $V_{TH2}$ (for example, a voltage corresponding to 90% of the second threshold voltage $V_{TH2}$) as the reference voltage $V_{REF}$ in the rising period of the rectified voltage $V_{rec}$ according to the reference voltage setting signal CS4. Furthermore, the reference voltage generator 220 according to the present invention may be configured to output a voltage obtained by adjusting the first threshold voltage $V_{TH1}$ (for example, a voltage corresponding to 110% of the first threshold voltage $V_{TH1}$) as the reference voltage $V_{REF}$ in the falling period of the rectified voltage $V_{ire}$ according to the reference voltage setting signal CS4. When another reference voltage setting signal CS4 is input, the reference voltage generator 220 according to the present invention may be configured to output a voltage obtained by adjusting the second threshold voltage $V_{TH2}$ (for example, a voltage corresponding to 110% of the second threshold voltage $V_{TH2}$) as the reference voltage $V_{REF}$ in the falling period of the rectified voltage $V_{rec}$ according to the reference voltage setting signal CS4.

The comparator 230 compares the voltage level of the set reference voltage $V_{REF}$ with the voltage level of the currently input rectified voltage $V_{rec}$, and outputs a first control signal EN_1 corresponding to the comparison result to the control logic 210. As illustrated in FIG. 3, the comparator 230 according to the present invention may be configured using an operational amplifier. The reference voltage $V_{REF}$ output from the reference voltage generator 220 is input to an inverting input of the is comparator 230, and a sensing voltage VB across a sensing resistor $R_s$ is input to a non-inverting input of the comparator 230. The comparator 230 is configured to compare the set reference voltage $V_{REF}$ and the sensing voltage VB across the sensing resistors Rs, and output the first control signal EN_1 corresponding to the comparison result to the control logic 210.

The control logic 210 controls a serial/parallel connection relationship between the first light emitting group 310 and the second light emitting group 320 according to the first control signal EN_1 input from the comparator 230, and outputs the reference voltage setting signal CS4, based on the first control signal EN_1 and the second control signal EN_2 input from the voltage edge detector 240.

Figure 7A:
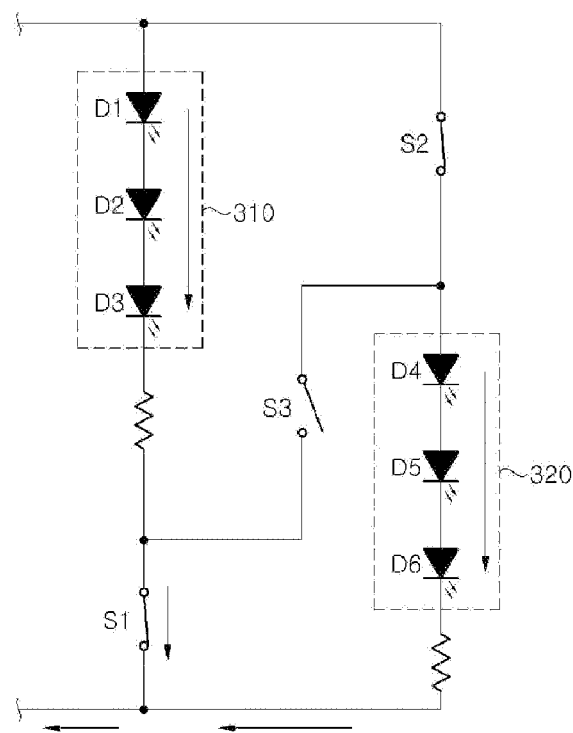
FIG. 7A is a circuit diagram illustrating a case where a first light emitting group and a second light emitting group according to an exemplary embodiment of the present invention are connected in parallel.
Figure 7B:
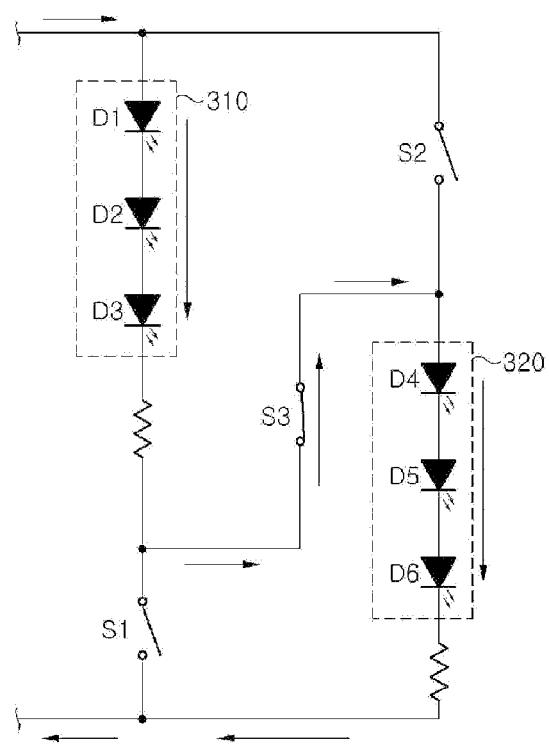
FIG. 7B is a circuit diagram illustrating a case where a first light emitting group and a second light emitting group according to an exemplary embodiment of the present invention are connected in series.

More specifically, first, the control logic 210 generates a first switch control signal CS1 and a second switch control signal CS2 for turning on the first switch S1 and the second switch S2 and outputs the first switch control signal CS1 and the second switch control signal CS2 to the first switch S1 and the second switch S2, and generates a third switch control signal CS3 for turning off the third switch S3 and outputs the third switch control signal CS3 to the third switch S3, so that the first light emitting group 310 and the second light emitting group 320 are connected in parallel at a time point at which the voltage level of the rectified voltage $V_{rec}$ reaches the first threshold voltage $V_{TH1}$ while being included in the period during which the voltage level of the rectified voltage $V_{rec}$ rises. The resultant parallel connection relationship between the first light emitting group 310 and the second light emitting group 320 is illustrated in FIG. 7A. In addition, the control logic 210 generates the first switch control signal CS1 and the second switch control signal CS2 for turning off the first is switch S1 and the second switch S2 and outputs the first switch control signal CS1 and the second switch control signal CS2 to the first switch S1 and the second switch S2, and generates the third switch control signal CS3 for turning off the third switch S3 and outputs the third switch control signal CS3 to the third switch S3 so that the first light emitting group 310 and the second light emitting group 320 are connected in series at a time point at which the voltage level of the rectified voltage $V_{rec}$ reaches the second threshold voltage $V_{TH2}$ while being included in the period during which the voltage level of the rectified voltage $V_{rec}$ rises. The resultant serial connection relationship between the first light emitting group 310 and the second light emitting group 320 is illustrated in FIG. 7B.

Furthermore, the control logic 210 generates the first switch control signal CS1 and the second switch control signal CS2 for turning on the first switch S1 and the second switch S2 and outputs the first switch control signal CS1 and the second switch control signal CS2 to the first switch S1 and the second switch S2, and generates the third switch control signal CS3 for turning off the third switch S3 and outputs the third switch control signal CS3 to the third switch S3, so that the first light emitting group 310 and the second light emitting group 320 are connected in parallel at a time point at which the voltage level of the rectified voltage $V_{rec}$ reaches the second threshold voltage $V_{TH2}$ while being included in the period during which the voltage level of the rectified voltage $V_{rec}$ falls. On the other hand, the control logic 210 turns off all of the first switch S1, the second switch S2, and the third switch S3 at a time point at which the voltage level of the rectified voltage $V_{rec}$ reaches the first threshold voltage $V_{TH1}$ while being included in the period during which the voltage level of the rectified voltage $V_{rec}$ falls.

In addition, as described above, the control logic 210 according to the present invention generates the reference voltage setting signal CS4, based on the first control signal EN_1 and the second control signal EN_2, and outputs the reference voltage setting signal CS4 to the reference voltage generator 220. More specifically, in the case where the voltage level of the rectified voltage $V_{rec}$ reaches the first threshold voltage $V_{TH1}$ in a state where the current reference voltage $V_{REF}$ is set as the first threshold voltage $V_{TH1}$, when the currently input rectified voltage $V_{rec}$ is included in the rising period, the control logic 210 sets the reference voltage $V_{REF}$ as the second threshold voltage $V_{TH2}$, and when the currently input rectified voltage $V_{rec}$ is included in the falling period, the control logic 210 generates the reference voltage setting signal CS4 so as to maintain the reference voltage $V_{REF}$ at the first threshold voltage $V_{TH1}$. Furthermore, in the case where the voltage level of the rectified voltage $V_{rec}$ reaches the second threshold voltage $V_{TH2}$ in a state where the current reference voltage $V_{REF}$ is set as the second threshold voltage $V_{TH2}$, when the currently input rectified voltage $V_{rec}$ is included in the rising period, the control logic 210 maintains the reference voltage $V_{REF}$ at the second threshold voltage $V_{TH2}$, and when the currently input rectified voltage $V_{rec}$ is included in the rising period, the control logic 210 generates the reference voltage setting signal CS4 so as to maintain the reference voltage $V_{REF}$ at the first threshold voltage $V_{TH1}$.

On the other hand, more preferably, the control logic 210 according to the present invention may generate the reference voltage setting signal CS4 so as to compensate for a delay caused by the signal processing within the LED driving control unit 200.

Figure 6A:
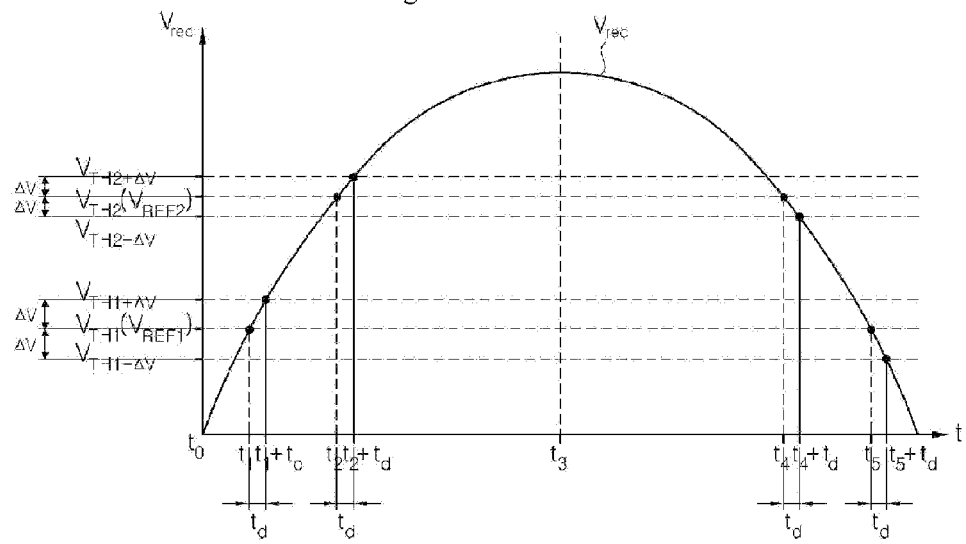
FIG. 6A is a waveform diagram illustrating a relationship between a rectified voltage and an LED control time point in a conventional AC LED lighting apparatus.

FIG. 6A is a waveform diagram illustrating a relationship between the rectified voltage and the LED control time point in the conventional AC LED lighting apparatus. The delay caused by the signal processing within the LED driving control unit 200 will be described as an example with reference to FIG. 6A. FIG. 6A illustrates an embodiment in which the reference voltage $V_{REF}$ is set to be equal to the threshold voltage $V_{TH}$. Accordingly, the first reference voltage $V_{REF1}$ is the first threshold voltage $V_{TH1}$, and the second reference voltage $V_{REF2}$ is the second threshold voltage $V_{TH2}$. In addition, in FIG. 6A, time points at which the voltage level of the rectified voltage $V_{rec}$ reaches the reference voltage $V_{REF}$ (that is, the threshold voltage $V_{TH}$), that is, time points t1, t2, t4 and t5 at which the control is initiated by the LED driving control unit 200, are indicated by dashed lines, and times points t1+td, t2+td, t4+td and t5+td at which the control of the switches is actually performed to change the serial/parallel connection relationship between the first light emitting group 310 and the second light emitting group 320 are indicated by solid lines. Referring to FIG. 6A, at the time point t2 at which the voltage level of the rectified voltage $V_{rec}$ rises from the first threshold voltage $V_{TH1}$ and reaches the second threshold voltage $V_{TH2}$, the control logic 210 generates and outputs the first switch control signal CS1, the second switch control signal CS2, and the third switch control signal CS3 so as to connect the first light emitting group 310 and the second light emitting group 320 in series. The first switch S1, the second switch S2, and the third switch S3 change the connection relationship between the first light emitting group 310 and the second light emitting group 320 to the serial connection according to the input control signal. In this case, the time point at which the switches actually change the serial/parallel connection relationship is a time point at which a predetermined time has elapsed after the voltage level of the rectified voltage $V_{rec}$ has reached the second threshold voltage $V_{TH2}$ (that is, a time point at which a delay time td has further elapsed). That is, a delay corresponding to the delay time td is generated between the time point t2 at which the voltage level of the rectified voltage $V_{rec}$ reaches the second threshold voltage $V_{TH2}$ and the time point t2+td at which the switches are actually switched.

Figure 6B:
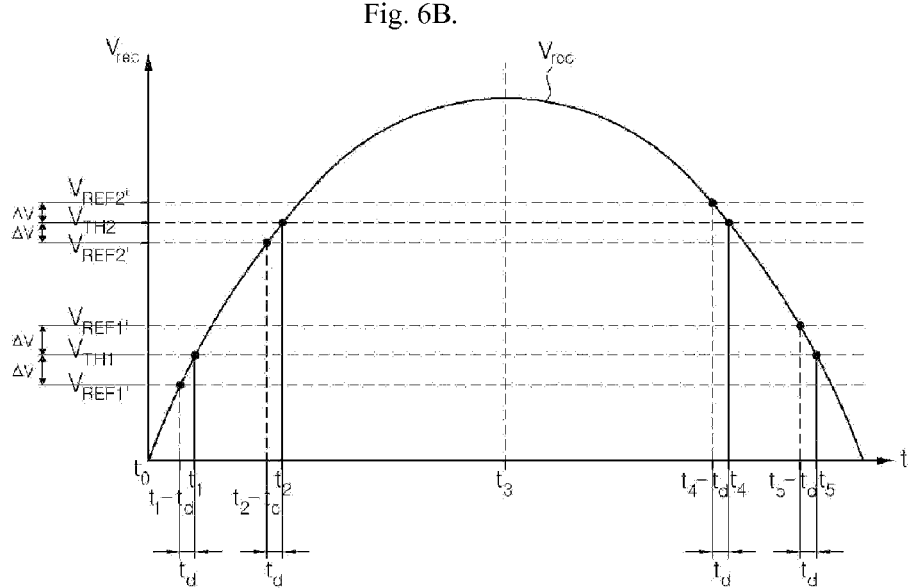
FIG. 6B is a waveform diagram illustrating a relationship between a rectified voltage and an LED control time point in an AC LED lighting apparatus according to an exemplary embodiment of the present invention.

Therefore, the control logic 210 according to the present invention may be configured to compensate for the above-described delay. FIG. 6B is a waveform diagram illustrating a relationship between the rectified voltage and the LED control time point in the AC LED lighting apparatus according to the exemplary embodiment of the present invention. Referring to FIG. 6B, the configuration and function for the delay compensation of the control logic 210 according to the present invention will be described with reference to FIG. 6B. Since the delay time td generated by the signal processing within the system is constant, the control logic 210 may calculate a variation $\Delta V$ in the voltage level of the rectified voltage $V_{rec}$ for the delay time td by using the information about the actual slope of the rectified voltage $V_{rec}$ included in the second control signal EN_2, and set the reference voltage $V_{REF}$, based on the calculated variation $\Delta V$. According to configurations of exemplary embodiments, the voltage edge detector 240 may detect the actual variation $\Delta V$ in the voltage level of the rectified voltage $V_{rec}$ for the delay time td, insert the detected variation into the second control signal EN_2, and output the second control signal EN_2 to the control logic 210, and the control logic 210 may set the reference voltage $V_{REF}$ by using the actual variation $\Delta V$ in the voltage level of the rectified voltage $V_{rec}$ for the delay time td included in the second control signal EN_2. That is, the control logic 210 according to the present invention may be configured to set the reference voltage $V_{REF}$ by using the threshold voltage $V_{TH}$ and the variation $\Delta V$ in the voltage level of the rectified voltage $V_{rec}$ for the calculated or actually measured delay time td. Therefore, when the rectified voltage $V_{rec}$ is included in the rising period, the control logic 210 sets a voltage value, which is obtained by subtracting the variation $\Delta V$ of the voltage level from the first threshold voltage $V_{TH1}$, as a first reference voltage $V_{REF1'}$, and sets a voltage value, which is obtained by subtracting the variation $\Delta V$ of the voltage level from the second threshold voltage $V_{TH2}$, as a second reference voltage $V_{REF2'}$. Furthermore, in a similar manner, when the rectified voltage $V_{rec}$ is included in the falling period, the control logic 210 sets a voltage value, which is obtained by adding the variation $\Delta V$ of the voltage level to the first threshold voltage $V_{TH1}$, as a first reference voltage $V_{REF1''}$, and sets a voltage value, which is obtained by adding the variation $\Delta V$ of the voltage level to the second threshold voltage $V_{TH2}$, as a second reference voltage $V_{REF2''}$.

In FIG. 6B, time points at which the voltage level of the rectified voltage reaches the reference voltage $V_{REF}$ (that is, the reference voltage adjusted by subtracting the variation $\Delta V$ of the voltage level of the rectified voltage $V_{rec}$ for the delay time td from the threshold voltage $V_{TH}$ or adding the variation $\Delta V$ of the voltage level of the rectified voltage $V_{rec}$ for the delay time td to the threshold voltage $V_{TH}$), that is, time points t1-td, t2-td, t4-td and t5-td at which the control is initiated by the LED driving control unit 200, are indicated by dashed lines, and time points t1, t2, t4 and t5 at which the control of the switches are actually performed to change the serial/parallel connection relationship between the first light emitting group 310 and the second light emitting group 320 are indicated by solid lines. Referring to FIG. 6B, it is assumed that the first threshold voltage $V_{TH1}$ is 65 V, the second threshold voltage $V_{TH2}$ is 130 V, and the variation $\Delta V$ in the rectified voltage $V_{rec}$ for the delay time td, which is calculated using the information about the actual slope of the rectified voltage $V_{rec}$, is 10 V. In this case, when intending to control the switches at the time point t2 at which the voltage level of the rectified voltage $V_{rec}$ reaches the second threshold voltage $V_{TH2}$ in the rising period of the rectified voltage $V_{rec}$, the control logic 210 may set 120 V (the adjusted second threshold voltage $V_{TH2}$), which is obtained by subtracting the variation (10 V) for the delay time td from the second threshold voltage $V_{TH2}$ (130 V), as the second reference voltage $V_{REF2'}$, in the rising period. Therefore, a process for controlling the switches is initiated at the time point t2-td at which the voltage level of the rectified voltage $V_{rec}$ reaches 120 V, and the voltage level of the rectified voltage $V_{rec}$ reaches the second threshold voltage $V_{TH2}$ (130 V) at the time point t2 at which the switches are actually switched. Consequently, the above-described delay may be compensated for. Similarly, when intending to control the switches at the time point t4 at which the voltage level of the rectified voltage $V_{rec}$ reaches the second threshold voltage $V_{TH2}$ in the falling period of the rectified voltage $V_{rec}$, the control logic 210 may set 140 V (the adjusted second threshold voltage $V_{TH2}$), which is obtained by adding the variation (10 V) for the delay time td to the second threshold voltage $V_{TH2}$ (130 V), as the second reference voltage $V_{REF2'''}$. Therefore, a process for controlling the switches is initiated at the time point t4-td at which the voltage level of the rectified voltage $V_{rec}$ reaches 140 V, and the voltage level of the rectified voltage $V_{rec}$ reaches the second threshold voltage $V_{TH2}$ (130 V) at the time point at which the delay time has elapsed after the initiation of the processing, that is, the time point t4 at which the switches are actually switched. Consequently, the above-described delay may be compensated for.

On the other hand, in order to prevent malfunction, the control logic 210 according to the present invention may be configured to further apply a margin value when compensating for the delay time td. For example, assuming that a margin value is set to 3 V, when it is calculated or detected that 10 V will be changed for the delay time td, the control logic 210 according to the present invention may be configured to calculate a reference voltage adjustment value for adjusting the reference voltage $V_{REF}$ in order to compensate for the delay time td by subtracting the preset margin value from the calculated variation $\Delta V$ (that is, 10 V), and set the reference voltage $V_{REF}$ by using the calculated reference voltage adjustment value. In this case, the control logic 210 may calculate the reference voltage adjustment value (7 V) by subtracting the preset margin value (3 V) from the variation $\Delta V$ (10V) of the rectified voltage for the calculated delay time, generate the reference voltage setting signal CS4 so as to set the voltage level obtained by subtracting the calculated reference voltage adjustment value (7 V) from the threshold voltage $V_{TH}$ as the reference voltage $V_{REF}$ in the rising period of the rectified voltage $V_{rec}$, and generate the reference voltage setting signal CS4 so as to set the voltage level obtained by adding the calculated reference voltage adjustment value (7 V) to the threshold voltage $V_{TH}$ as the reference voltage $V_{REF}$ in the falling period of the rectified voltage $V_{rec}$.

On the other hand, in order to prevent malfunction, the control logic 210 according to the present invention may be configured to further apply a minimum reference voltage adjustment value and a maximum reference voltage adjustment value when compensating the delay time td. That is, the control logic 210 according to the present invention may be configured to compare the calculated variation $\Delta V$ with the set minimum reference voltage adjustment value and the set maximum reference voltage adjustment value, set the reference voltage $V_{REF}$ by setting the calculated variation $\Delta V$ as the reference voltage adjustment value when the calculated variation $\Delta V$ is equal to or greater than the set minimum reference voltage adjustment value and equal to or less than the set maximum reference voltage adjustment value, set the reference voltage $V_{REF}$ by setting the set minimum reference voltage adjustment value as the reference voltage adjustment value when the calculated variation $\Delta V$ is less than the set minimum reference voltage adjustment value, and set the reference voltage $V_{REF}$ by setting the set maximum reference voltage adjustment value as the reference voltage adjustment value when the calculated variation $\Delta V$ is greater than the set maximum reference voltage adjustment value. For example, assuming that the minimum reference voltage adjustment value is set to 5 V and the maximum reference voltage adjustment value is set to 15 V, when the calculated variation $\Delta V$ is equal to or greater than the minimum reference voltage adjustment value and equal to or less than the maximum reference voltage adjustment value (when the calculated variation $\Delta V$ is 7 V), the control logic 210 sets the reference voltage $V_{REF}$ by setting the calculated variation $\Delta V$ as the reference voltage adjustment value. On the other hand, when the calculated variation $\Delta V$ is less than the minimum reference voltage adjustment value (when the calculated variation $\Delta V$ is 3 V), the control logic 210 sets the reference voltage $V_{REF}$ by setting the set minimum reference voltage adjustment value as the reference voltage adjustment value. Furthermore, when the calculated variation $\Delta V$ is greater than the maximum reference voltage adjustment value (when the calculated variation $\Delta V$ is 16 V), the control logic 210 sets the reference voltage $V_{REF}$ by setting the set minimum reference voltage adjustment value as the reference voltage adjustment value.

In addition, according to configurations of exemplary embodiments, the control logic 210 according to the present invention may be configured to further apply the above-described margin value, minimum reference voltage adjustment value, and maximum reference voltage adjustment value.

Table 1 below shows the adjusted reference voltages set such that the actual switching control is performed at the time points at which the voltage level reaches a target threshold voltage in the rising and falling periods for the compensation of the voltage variation for the delay time.

TABLE 1

| Target Threshold Voltage | Period | Adjusted Reference Voltage ($V_{REF}$) |
| --- | --- | --- |
| $V_{TH1}$ | Rising | $V_{REF1'} = V_{TH1} - \Delta V$ |
| $V_{TH1}$ | Falling | $V_{REF1''} = V_{TH1} + \Delta V$ |
| $V_{TH2}$ | Rising | $V_{REF2'} = V_{TH2} - \Delta V$ |
| $V_{TH2}$ | Falling | $V_{REF2''} = V_{TH2} + \Delta V$ |

As shown in Table 1 above, the preliminary control may be initiated by subtracting the variation of the rectified voltage $V_{rec}$ for the delay time in the rising period of the rectified voltage $V_{rec}$, and the preliminary control may be initiated by adding the variation of the rectified voltage $V_{rec}$ for the delay time in the falling period of the rectified voltage Vrec.

On the other hand, as illustrated in FIG. 3, the LED driving control unit 200 according to the present invention may include a fourth switch S4 disposed between a rectified voltage ($V_{rec}$) input node and the sensing resistor $R_s$ to control a connection between the sensing resistor $R_s$, the rectified voltage ($V_{rec}$) input node, and the sensing resistor $R_s$ according to the control signal output from the control logic 210.

Figure 4:
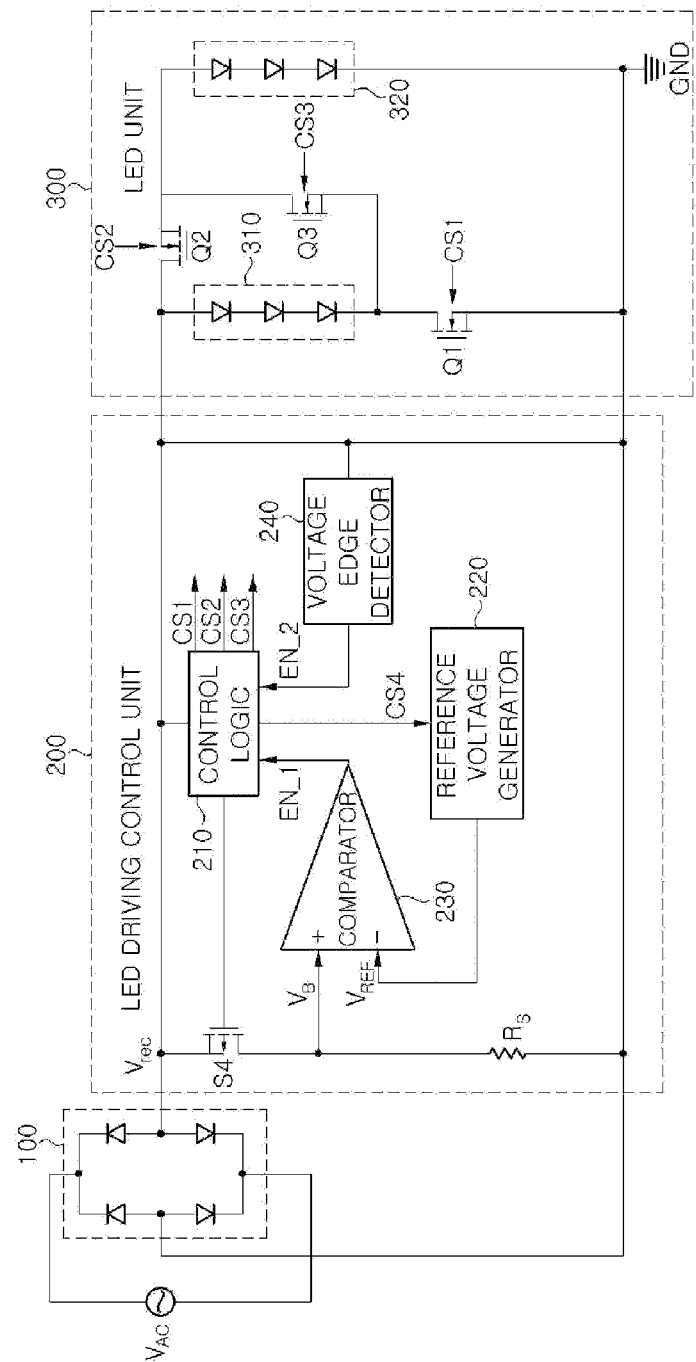
FIG. 4 is a circuit diagram of an AC LED lighting apparatus according to an exemplary embodiment of the present invention.

FIG. 4 is a circuit diagram of an AC LED lighting apparatus according to an exemplary embodiment of the present invention. FIG. 4 is a circuit diagram of an exemplary embodiment in which the first switch S1, the second switch S2, and the third switch S3 illustrated in FIG. 3 are implemented using MOSFETs. Since the AC LED lighting apparatus according to the present exemplary embodiment has the same configuration and function as those of the LED lighting apparatus of FIG. 3, further description thereof will be omitted.

Figure 5:
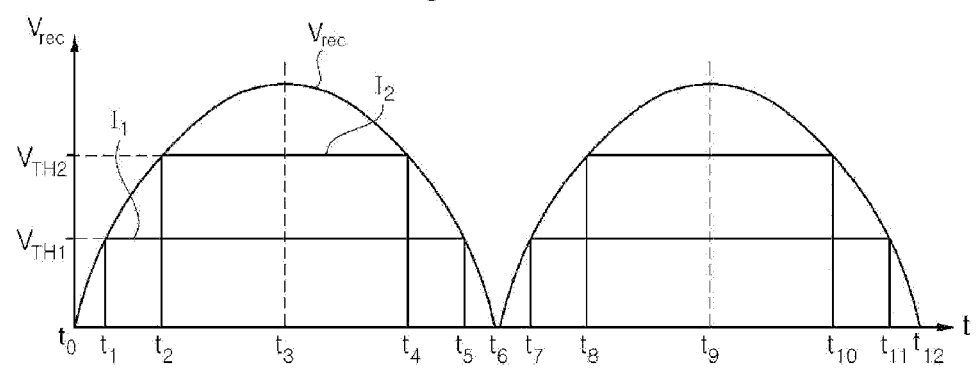
FIG. 5 is a waveform diagram illustrating waveforms of a rectified voltage and an LED driving current in an AC LED lighting apparatus according to an exemplary embodiment of the present invention.

FIG. 5 is a waveform illustrating waveforms of the rectified voltage and the LED driving current in the AC LED lighting apparatus according to the exemplary embodiment of the present invention. Hereinafter, a process of driving the AC LED lighting apparatus according to the exemplary embodiment of the present invention, based on the elapse of time, will be described in detail with reference to FIG. 5:

First, Table 2 below summarizes the operation state of each component of the AC LED lighting apparatus according to the control of the LED driving control unit 200, based on the voltage level of the rectified voltage $V_{rec}$ for one cycle.

TABLE 2

| Rectified Voltage ($V_{rec}$) | Reference Voltage ($V_{REF}$) | Slope of Rectified Voltage | S1 | S2 | S3 | Operation |
|---|---|---|---|---|---|---|
| $0 \leq V_{rec} < V_{TH1}$ | $V_{TH1}$ | Rising | OFF | OFF | OFF | No |
| $V_{TH1} \leq V_{rec} < V_{TH2}$ | $V_{TH2}$ | Rising | ON | ON | OFF | Parallel |
| $V_{TH2} \leq V_{rec} \leq V_{rec\_max}$ | $V_{TH2}$ | Rising | OFF | OFF | ON | Serial |
| | $V_{TH2}$ | Falling | OFF | OFF | ON | Serial |
| $V_{TH1} \leq V_{rec} < V_{TH2}$ | $V_{TH1}$ | Falling | ON | ON | OFF | Parallel |
| $0 \leq V_{rec} < V_{TH1}$ | $V_{TH1}$ | Falling | OFF | OFF | OFF | No |

Period 1 (t0 to t1)

When the fourth switch S4 is turned on, the voltage VB across the sensing resistor $R_s$ rises according to the change of the rectified voltage $V_{rec}$. Since the voltage VB is lower than the turn-on voltage $V_{TH1}$ of the LED unit 300 in this period, the control logic 210 receiving the first control signal EN_1 output from the comparator 230 and the second control signal EN_2 (rising period) output from the voltage edge detector 240 outputs the reference voltage setting signal CS4 to the reference voltage generator 220 so as to set the reference voltage $V_{REF}$ as the first threshold voltage $V_{TH1}$. In this case, all of the first switch S1, the second switch S2, and the third switch S3 are maintained in the turned-off state.

Period 2 (t1 to t2):

In a state where the fourth switch S4 is turned on, the control logic 210 receiving the first control signal EN_1 output from the comparator 230 and the second control signal EN_2 (rising period) output from the voltage edge detector 240 at the moment when the voltage VB exceeds the first threshold voltage $V_{TH1}$ connecting the first light emitting group 310 and the second light emitting group 320 of the LED unit 300 in parallel by turning on the first switch S1 and the second switch S2 and turning off the third switch S3, so that the LEDs emit light. Furthermore, the control logic 210 outputs the reference voltage setting signal CS4 to the reference voltage generator 220 so as to set the reference voltage $V_{REF}$ as the second threshold voltage $V_{TH2}$. In this case, the current flowing through the LED unit 300 is constant-current controlled to a first current value $I_1$ based on the reference voltage $V_{REF}$.

Period 3 (t2 to t3):

At the time point at which the voltage VB exceeds the second threshold voltage $V_{TH2}$, the control logic 210 receiving the first control signal EN_1 output from the comparator 230 and the second control signal EN_2 (rising period) output from the voltage edge detector 240 connects the first light emitting group 310 and the second light emitting group 320 of the LED unit 300 in series by turning off the first switch S1 and the second switch S2 and turning on the third switch S3, so that the LEDs emit light. Furthermore, the control logic 210 outputs the reference voltage setting signal CS4 to the reference voltage generator 220 so as to set the reference voltage $V_{REF}$ as the second threshold voltage $V_{TH2}$. In this case, the current flowing through the LED unit 300 is constant-current controlled to a second current value $I_2$ based on the reference voltage $V_{REF}$.

Period 4 (t3 to t4):

The control logic 210 receiving the first control signal EN_1 output from the comparator 230 and the second control signal EN_2 (falling period) output from the voltage edge detector 240 determines that the voltage VB across the sensing resistor $R_s$ is still higher than the second threshold voltage $V_{TH2}$, and perform control such that the first switch S1 and the second switch S2 are maintained in the turned-off state and the third switch S3 is maintained in the turned-on state. Furthermore, the control logic 210 outputs the reference voltage setting signal CS4 to the reference voltage generator 220 so as to maintain the reference voltage $V_{REF}$ with the second threshold voltage $V_{TH2}$. In this case, the current flowing through the LED unit 300 is constant-current controlled to the second current value $I_2$ based on the reference voltage $V_{REF}$.

Period 5 (t4 to t5):

At the time point at which the voltage VB is lower than the second threshold voltage $V_{TH2}$, the control logic 210 receiving the second control signal EN_2 (falling period) output from the voltage edge detector 240 and the first control signal EN_1 output from the comparator 230 connects the first light emitting group 310 and the second light emitting group 320 in parallel by turning off the first switch S1 and the second switch S2 and turning on the third switch S3. Therefore, the connection relationship between the first light emitting group 310 and the second light emitting group 320 changed from the serial connection to the parallel connection in the period 5, so that light emission corresponding to the applied voltage is maintained. Furthermore, the control logic 210 outputs the reference voltage setting signal CS4 to the reference voltage generator 220 so as to set the reference voltage $V_{REF}$ as the first threshold voltage $V_{TH1}$. In this case, the current flowing through the LED unit 300 is constant-current controlled to the first current value $I_1$ based on the reference voltage $V_{REF}$.

Period 6 (t5 to t6):

When the voltage VB is lower than the first threshold voltage $V_{TH1}$, the control logic 210 receiving the first control signal EN_1 output from the comparator 230 and the second control signal EN_2 (falling period) output from the voltage edge detector 240 turns off all LEDs of the LED unit 300 by turning off all of the first switch S1, the second switch S2, and the third switch S3 of the LED unit 300.

As described above, according to the present invention, it is possible to detect the rising or falling slope of the input voltage by using the voltage edge detector and accurately control the driving control time point of the AC LED lighting apparatus.

Furthermore, according to the present invention, it is possible to detect the rising or falling slope of the input voltage by using the voltage edge detector and accurately control the change time point of the serial/parallel connection relationship between the plurality of light emitting groups.

Moreover, according to the present invention, it is possible to expect the effect that can improve optical uniformity and brightness of the lighting apparatus by causing all light emitting groups to emit light at above a predetermined voltage level in such a manner that the series/parallel connection relationship among the plurality of LED groups are accurately controlled according to the voltage level of the rectified voltage.

While the embodiments of the present invention have been described with reference to the specific embodiments, they are provided merely for fully understanding of the present invention, but the present invention is not limited to the embodiments. It will be apparent to those skilled in the art that various changes and modifications may be made without departing from the spirit and scope of the invention as defined in the following claims.

Therefore, the spirit of the present invention should not be limited to the embodiments, and it will be apparent that the claims and the equivalents or equivalent modifications thereof fall within the scope of the present invention.

What is claimed is:

1. A light emitting diode (LED), comprising:
a driving control unit configured to control driving of light emitting groups according to a voltage level of a rectified voltage, the driving control unit comprising:
a voltage edge detector configured to detect a variation of an input rectified voltage, and output a first control signal corresponding to the variation of the rectified voltage to a control logic;
a reference voltage generator configured to generate a reference voltage according to a reference voltage setting signal output from the control logic;
a comparator configured to compare the reference voltage with the rectified voltage, and output a second control signal to the control logic,
wherein the control logic is configured to control driving the light emitting groups by detecting the first control signal and the second control signal, and output the reference voltage setting signal, and
wherein the control logic is configured to generate a reference voltage adjustment value based on the first control signal to compensate for a signal processing delay within the driving control unit, and set the reference voltage setting signal based on a threshold voltage of the light emitting groups and the reference voltage adjustment value.

2. The LED driving control unit of claim 1, wherein the control logic is configured to set the reference voltage based on whether the rectified voltage is in a rising period or a falling period.

3. The LED driving control unit of claim 2, wherein the control logic is configured to:
generate the reference voltage adjustment value in the rising period of the rectified voltage, wherein a voltage level calculated by subtracting the reference voltage adjustment value from the threshold voltage is set as the reference voltage; and
generate the reference voltage adjustment value in the falling period of the rectified voltage, wherein a voltage level calculated by adding the reference voltage adjustment value to the threshold voltage is set as the reference voltage.

4. The LED driving control unit of claim 3, wherein the control logic is configured to generate the reference voltage adjustment value by subtracting a margin value from the second control signal.

5. The LED driving control unit of claim 1, wherein:
the reference voltage adjustment value is less than a maximum reference voltage adjustment value; and
the control logic is configured to set the maximum reference voltage adjustment value as the reference voltage adjustment value when the variation of the rectified voltage is greater than the maximum reference voltage adjustment value.

6. The LED driving control unit of claim 1, wherein:
the reference voltage adjustment value is greater than a minimum reference voltage adjustment value; and
the control logic is configured to set the minimum reference voltage adjustment value as the reference voltage adjustment value when the variation of the rectified voltage is less than the minimum reference voltage adjustment value.

7. The LED driving control unit of claim 1, wherein each of the light emitting groups has the same threshold voltage.

8. The LED driving control unit of claim 1, wherein the control logic is configured to establish a serial or parallel connection between the light emitting groups, by comparing the rectified voltage with the reference voltage.

9. The LED driving control unit of claim 1, wherein the control logic is configured to control sequential driving of the light emitting groups by comparing the voltage level of the rectified voltage with the reference voltage.

10. A method of driving a light emitting diode (LED) comprising a driving control unit for rectifying an alternating current (AC) voltage and controlling driving of light emitting groups according to a voltage level of a rectified voltage, the method comprising:
detecting a variation of the rectified voltage and generating a reference voltage adjustment value based on the rectified voltage;
setting a reference voltage based on a threshold voltage of the light emitting groups and the reference voltage adjustment value; and
controlling driving of the light emitting groups by comparing the voltage level of the rectified voltage with the reference voltage, and controlling at least one switch.

11. The method of claim 10, wherein the reference voltage is set based on whether the rectified voltage is in a rising period or a falling period.

12. The method of claim 11, wherein:
the reference voltage is set in the rising period of the rectified voltage, wherein a voltage level calculated by subtracting the reference voltage adjustment value from a threshold voltage is set as the reference voltage, and the reference voltage is set in the falling period of the rectified voltage, wherein a voltage level calculated by adding the reference voltage adjustment value to the threshold voltage is set as the reference voltage.

13. The method of claim 10, wherein detecting the variation of the rectified voltage and generating the reference voltage adjustment value comprises subtracting a margin value from the variation of the rectified voltage.

14. The method of claim 13, wherein:
the reference voltage adjustment value is set to a value less than a maximum reference voltage adjustment value;
the variation of the rectified voltage is detected in order to compensate for a signal processing delay; and
the maximum reference voltage adjustment value is set as the reference voltage adjustment value when the variation of the rectified voltage is greater than the maximum reference voltage adjustment value.

15. The method of claim 13, wherein:
the reference voltage adjustment value is set to a value greater than a minimum reference voltage adjustment value;
the variation of the rectified voltage is detected in order to compensate for a signal processing delay; and
the minimum reference voltage adjustment value is set as the reference voltage adjustment value when the variation of the rectified voltage is less than the minimum reference voltage adjustment value.

16. The method of claim 10, wherein each of the light emitting groups has the same threshold voltage.

17. The method of claim 10, further comprising controlling a serial or parallel connection between the light emitting groups, by comparing a voltage level of the rectified voltage with the reference voltage.

18. The method of claim 10, further comprising controlling sequential driving between the light emitting groups by comparing a voltage level of the rectified voltage with the reference voltage.

* * * * *